(12) United States Patent
Groos

(10) Patent No.: US 6,744,375 B1
(45) Date of Patent: Jun. 1, 2004

(54) DEVICE AND METHOD FOR DETERMINING AND DISPLAYING TRAVEL OR FITNESS QUANTITIES OF A USER OF A SPORTS EQUIPMENT

(76) Inventor: Daniel Groos, Belgradstrasse 1, D-80796 München (DE)

(*) Notice: Subject to any disclaimer, the term of this patent is extended or adjusted under 35 U.S.C. 154(b) by 46 days.

(21) Appl. No.: 09/962,807

(22) Filed: Sep. 26, 2001

Related U.S. Application Data

(63) Continuation of application No. PCT/EP00/02630, filed on Aug. 24, 2000.

(30) Foreign Application Priority Data

Mar. 29, 1999 (DE) .......................... 199 14 262
May 24, 1999 (DE) .......................... 199 23 452

(51) Int. Cl.[7] .............................................. H04Q 9/00
(52) U.S. Cl. ............................... 340/870.07; 377/24.2; 73/490
(58) Field of Search ................. 340/870.07; 280/841, 280/11.19, 11.221; 377/24.2; 73/490

(56) References Cited

U.S. PATENT DOCUMENTS 5,721,539 A  2/1998  Goetzl 6,571,111 B1 * 5/2003 Mayo et al. ............... 455/574

FOREIGN PATENT DOCUMENTS

DE  297 13 992   1/1998
WO  WO 98/06466  2/1998
WO  WO 98/26846  6/1998

* cited by examiner

Primary Examiner—Timothy Edwards
(74) Attorney, Agent, or Firm—Shlesinger, Arkwright & Garvey LLP

(57) ABSTRACT

A device for determining and displaying travel data of a user of a sports equipment which has contact with the ground, comprises a first microcontroller associated with the sports equipment for at least recording or partially processing travel data of the sports equipment based on an interaction between the sports equipment and the ground; and a transmitter for transmitting the travel data to a receiver having a display. The receiver has a second microcontroller for at least further processing or displaying the partially processed travel data. The transmitter only transmits within defined transmitting intervals such that between the intervals when the transmitter is not transmitting, the transmitter is switched off. The receiver is synchronized with the such that the receiver is switched on only when the transmitter is expected to transmit and switched off when transmission is not expected from the transmitter.

12 Claims, 4 Drawing Sheets

DIAGRAM OF REAL TIME PER REVOLUTION
VERSUS REVOLUTION

SCHEMATIC DIAGRAM OF TIME PER REVOLUTION
VERSUS TIME

DEVICE AND METHOD FOR DETERMINING AND DISPLAYING TRAVEL OR FITNESS QUANTITIES OF A USER OF A SPORTS EQUIPMENT

This is a continuation application of international application no. PCT/EP00/02635, filed Mar. 24, 2000.

FIELD OF THE INVENTION

The present invention relates to a device to determine and display travel quantities of a user of a sports equipment, in particular of a sports equipment which has a contact with the ground at least at times.

BACKGROUND OF THE INVENTION

Sports equipment which can be fitted to the feet, for example inline skates, roller skates, grass skis, skateboards, snakeboards or sports boots are very popular. In this connection, one should mention other types of sports equipment also, for example, fitness equipment, muscle training equipment, skis, sledges, bobs, bicycles etc. There is a need to determine the sports achievements performed with such sports equipment, for example, the distances traveled or the speeds reached (current speed, maximum speed, average speed).

A road skate with a travel computer which is fitted to the boot of the road skate is known from DE-GM 92 09 825.8. To transfer data from the rollers of the road skate to said travel computer, a friction wheel is provided which acts together with a driver wheel attached to the roller suspension. The travel data determined or computed for a user is displayed here on the topside of the boot of the road skate. The accessing of this data is considered as unpractical and not user friendly.

It is known from WO98/26846 to provide a wheel for roller skates and roller boards with means provided in the wheel for determining its rotating speed and/or the actual speed of travel of a user of the sports equipment. In particular, it is described that the wheel is provided with radio link means for the transfer of data to a display device, in particular one formed in the manner of a wristwatch, to display the data determined.

It is known from DE 297 13 992 U1 to provide a device for measuring travel parameters related to inline skates. Here also, travel data is transferred via a transceiver system to a display device, for example, a wristwatch. In this device, the data determined is continuously transferred to the receiver or display device, this being considered as disadvantageous. Therefore, there is a high power consumption at the inline skates, i.e. the location of the transceiver system. For example, in a battery operated sensor this results in that the battery has to be replaced frequently, whereby the user friendliness of the device is strongly reduced.

It is known from WO98/06466 also to provide a speed measuring device for roller skates, in particular inline skates, in which the rollers are arranged one behind the other. At least one measuring means is mounted on the inline skate or integrated in it. According to a preferred embodiment, a pulse generator system consists of a magnet and a magnetic switch. Finally, a similar system is known from U.S. Pat. No. 5,721,539.

OBJECTS AND SUMMARY OF THE INVENTION

It is the object of this invention to provide a device and a method with which travel quantities of a user of a sports equipment, which has contact with the ground at least at times, can be determined and displayed in a simple manner, whereby in comparison to other conventional devices or methods, a greater user friendliness and less power consumption is achieved.

According to the invention, travel quantities of a user of a sports equipment, for example inline skates, can now be determined and displayed in a very simple, user friendly and energy saving manner. As a send or receive mode occurs only during defined time intervals, the power consumption of the transmitting/receiving means can be reduced noticeably in comparison to solutions known from prior art. As a result of this, a battery provided in or on the sports equipment, in particular in or on a wheel of an inline skate, which is used for the operation of the transmitter and/or a microcontroller for processing recorded travel or fitness data, has a considerably longer service life than in case of conventional solutions.

It will be appreciated that the term "sports equipment" used in the present patent application, in particular in the claims, should comprise all possible sports equipment from which travel or fitness data is derivable. In addition to the already mentioned sports equipment for fitting to the feet, sports equipments which are, for example to be held with the hands, for example, tennis rackets or golf clubs, or static fitness equipments also, for example, treadmills or stair climbers are mentioned. By attaching an appropriately constructed sensor provided with transmission means to the head of a golf club or tennis racket it is thus, for example possible to transfer speed or acceleration data of a club or racket of this type to a display visible to the user. The term used also comprises altimeters.

As typical travel data, in particular, current speed, average speed, distance traveled, acceleration or also altitude traveled is mentioned. Typical fitness data is, for example, pulse rate, perspiration rate etc. But the term "fitness data" can comprise also any other measurable physiological data or parameters.

The device according to the invention is characterized by synchronization means allocated to the transmitting means and receiving means for synchronizing switch-on timing and switch-off timing of said transmitting means and said receiving means. Synchronization means of this type can be realized via hardware or also via software, whereby appropriately designed microcontrollers are conveniently used in this connection.

Corresponding advantages result when a battery is used for the power supply to the user accessible device for further processing and/or displaying travel or fitness data.

According to a particularly preferred embodiment of the device according to the invention, the transmitting means and receiving means are designed in such a way that each of their first intervals, i.e. the intervals during which a transmission or a reception takes place, overlap to a large extent. The power consumption at the transmitter end as also at the receiver end can be minimized with this measure. For example, a synchronization of each of the first intervals of the transmitting means and receiving means can be effected in that before starting a measurement, the device at the receiver end for further processing or for displaying the travel or fitness data of the user is activated, whereupon a microcontroller of this device switches on the receiver for a defined start time interval (for example 30 seconds). When during this interval the receiver receives a signal from the electronic means at the transmitter end, this signal can be used for synchronizing each of the first intervals of the transmitting means and receiving means. This results in that the receiving means is switched on only when a transmission is expected from the transmitting means. When the receiving means do not recognize a signal during the start interval, it is, for example, possible to automatically switch off the device at the receiver end for the further processing or displaying of travel or fitness data, whereby, advantageously, it must be manually switched on again for carrying out a measurement.

According to another preferred embodiment of the invention, for which separate protection is requested, the means for recording or at least partially processing the travel data determine an intermediate signal on the basis of the revolutions of a wheel of the sports equipment, in particular a function illustrating the time per revolution of the wheel, whereby this intermediate signal is transmittable to the means for further processing and is modifiable there, by taking into account an adjustable actual wheel diameter. Hereby it is possible to execute in a simple manner, a large part of the processing of travel or fitness data at the transmitter or sender end, i.e. directly on the sports equipment. For example, it is possible to enter at the receiver end a pre-programmable standard wheel diameter or circumference, so that a software installed at the receiver end can compute in a simple manner the travel data (for example, distance per time) actually determined.

Appropriately, the revolution of the wheel is determined by means of a reed contact mounted in or on the wheel in a non-rotating manner, which acts together with a magnet that rotates along with the wheel. The magnet is integrated into the wheel in such a way that it closes a circuit in the reed contact which is part of the means for recording or at least partially processing the travel data. A reed contact mechanism of this type proves to be particularly robust and reliable in practice.

BRIEF DESCRIPTION OF THE DRAWINGS

A preferred embodiment of the invention is now described in detail with reference to the accompanying drawings in which:

FIG. 6 shows a schematic top view of a preferred embodiment of a display device usable according to the invention.

DETAILED DESCRIPTION OF THE INVENTION

Figure 1:
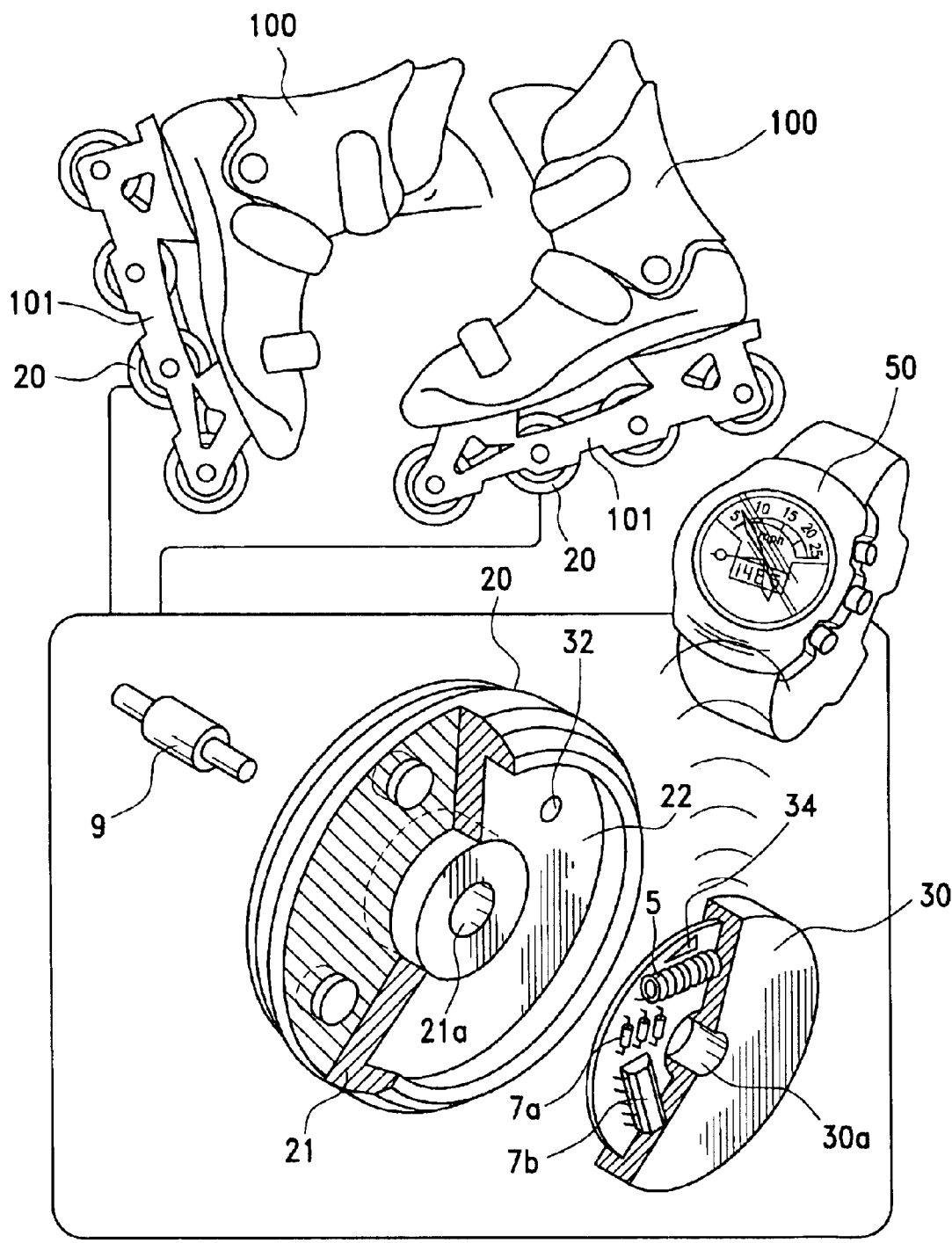
FIG. 1 shows in a perspective view a preferred embodiment of a wheel usable with the device according to the invention, with the arrangement of the wheel on an inline skate and the transfer of measured data to a device designed in the manner of a wristwatch for further processing and/or displaying recorded or partially processed travel data additionally shown by way of illustration of the device according to the invention.

With reference to FIG. 1, at first, the individual components of the device according to the invention are described with the example of a speedometer for an inline skate.

A wheel 20 comprises a wheel body 21 which is provided with a recess 22. A permanent magnet 32 is integrated in the wheel body 21.

One possible positioning of the wheel on a roller skate or inline skate 100 is also shown schematically in FIG. 1. The fixing of the wheel axle 9 to a wheel rail 101 is performed here in a known manner and need not be explained here further.

In the recess 22 of the wheel body 21, a puck-shaped or cylindrical disk-shaped, in particular tapered component 30 can be fitted or inserted. The electrical or electronic components required for recording or at least partially processing the travel data on the basis of an interaction between the inline skate and the ground (not shown) are integrated in this component 30. By way of example, a coil 5, resistors or an amplifier 7a and a microcontroller 7b of the electronic control means are shown schematically. These components are preferably cast or sealed watertight into the component 30, which, in particular, is made of synthetic resin. The component 30 has a central recess 30a which, when the component 30 is inserted in the recess 22 of the wheel body 21, aligns with a central recess 21a formed there. A non-rotating axle 9 can be fitted through the aligned recesses 21a, 30a. The component 30 can be connected in a non-rotating manner with the axle 9. When the wheel turns, the axle 9 and component 30 thus remain nonrotatory with respect to the rotating wheel 20. Pivot and roller bearings appropriately used in this connection are not shown in FIG. 1. It proves to be advantageous that the component 30 containing the electronic control means can be replaced in modular form. By means of a sender or transmitter 34, travel data recorded or partially processed via the microcontroller 7b can be transferred by radio to a device 50 designed in the manner of a wristwatch, which is used for further processing or displaying the travel data, as shown also schematically in FIG. 1. Here, it is to be noted that the complete processing of travel data (for making available the travel quantities) can occur already by means of the microcontroller 7b, i.e. at the transmitter end. In this case, the device 50 is used only for displaying the travel quantities determined on the basis of travel data.

Figure 2:
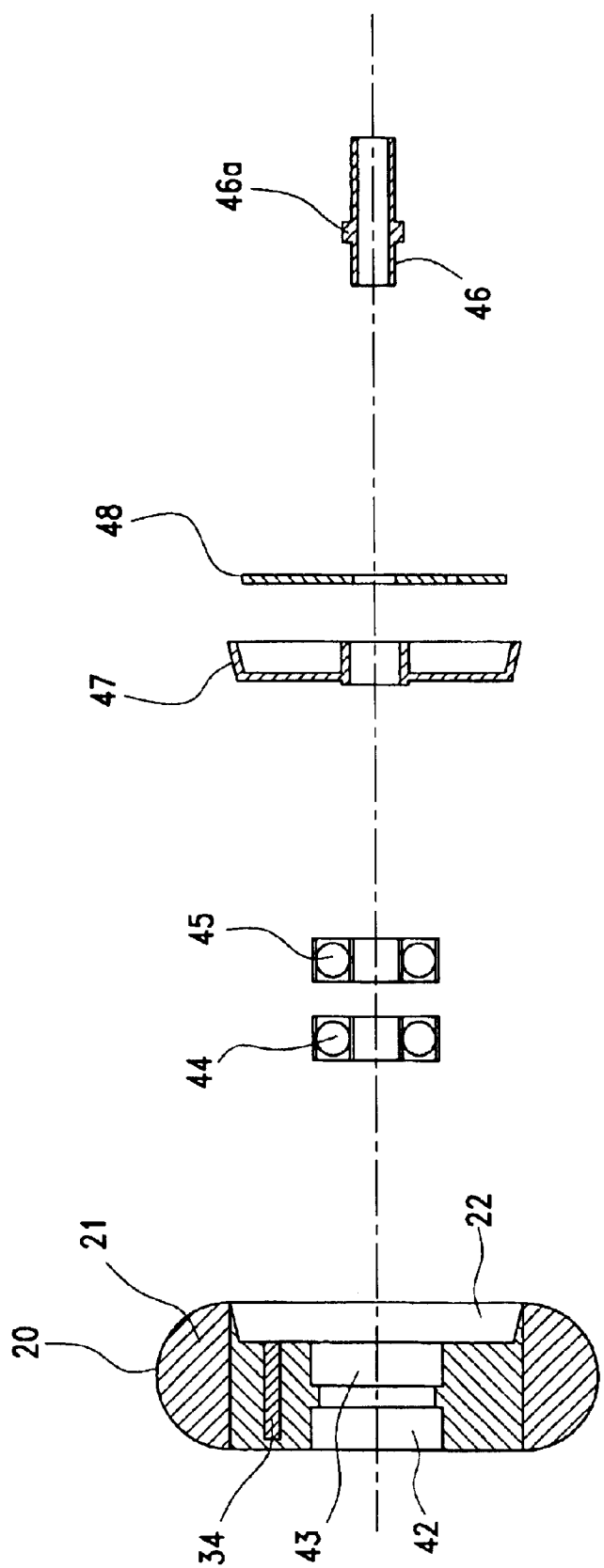
FIG. 2 shows another preferred embodiment of a wheel of an inline skate usable according to the invention.

A particularly preferred embodiment of a wheel usable according to the invention is shown in FIG. 2 in an exploded view. Identical components are marked here with reference numbers corresponding to FIG. 1.

It can be very clearly recognized here, how the magnet 32 is integrated into the wheel body 21 of the wheel 20. Further, following the recess 22, two additional recesses 42, 43 are provided, into which ball or roller bearings 44, 45 can be inserted. After introducing the first roller bearing 44 in the recess 42, it is provided to insert a spacer element 46 having a spacing projection 46a into the middle recess of the roller bearing 44 up to the stop (i.e. contact between roller bearing 44 and projection 46a), and correspondingly to slide the roller bearing 45 on at the opposite side of the projection 46a of the spacer element 46. The length of the part of the spacer element 46 at the right side (in the figure) is such that a housing 47 together with a housing cover 48 can be slided onto the spacer element. The housing 47 is provided to accommodate the puck-shaped component 30 (not shown in FIG. 2), which contains the electronic components of the device according to the invention.

The wheel shown has the function of a normal running wheel of an inline skate and can therefore be replaced without problems with a conventional roller.

The wheel axle 9 shown in FIG. 1 can be lead through the spacer element 46 and can be fixed to it.

As already described with reference to FIG. 1, when the inline skates are in use, the components 30, 47, 48 and also 46 do not rotate, while the wheel body 21 with the magnet 32 integrated into it rotates around the rotary axis of the wheel.

Figure 4:
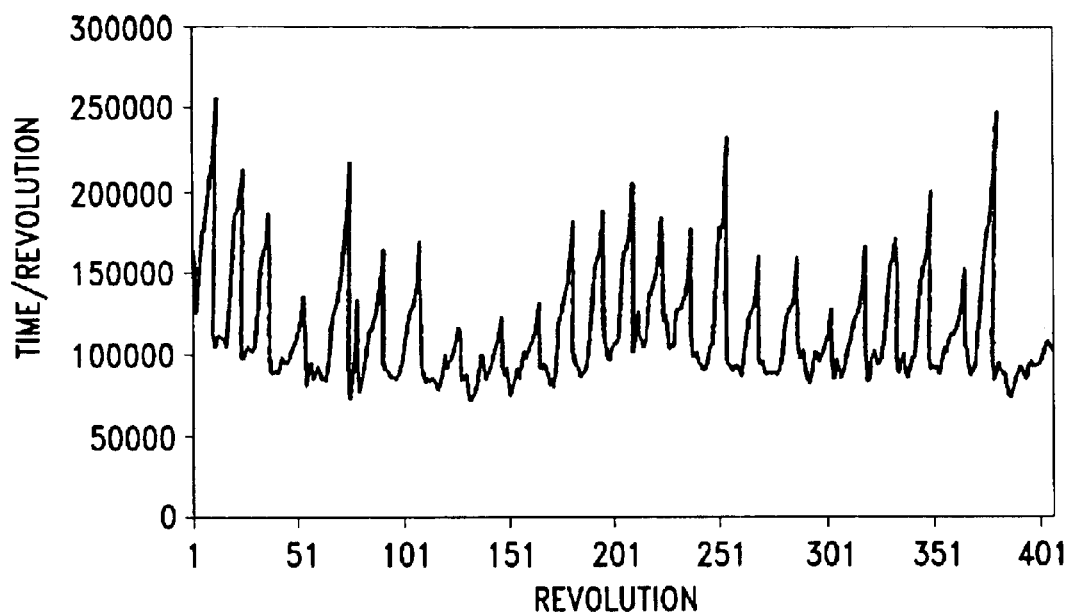
FIG. 4 shows a diagram in which the respective real time per revolution of a wheel is plotted over the revolutions.
Figure 5:
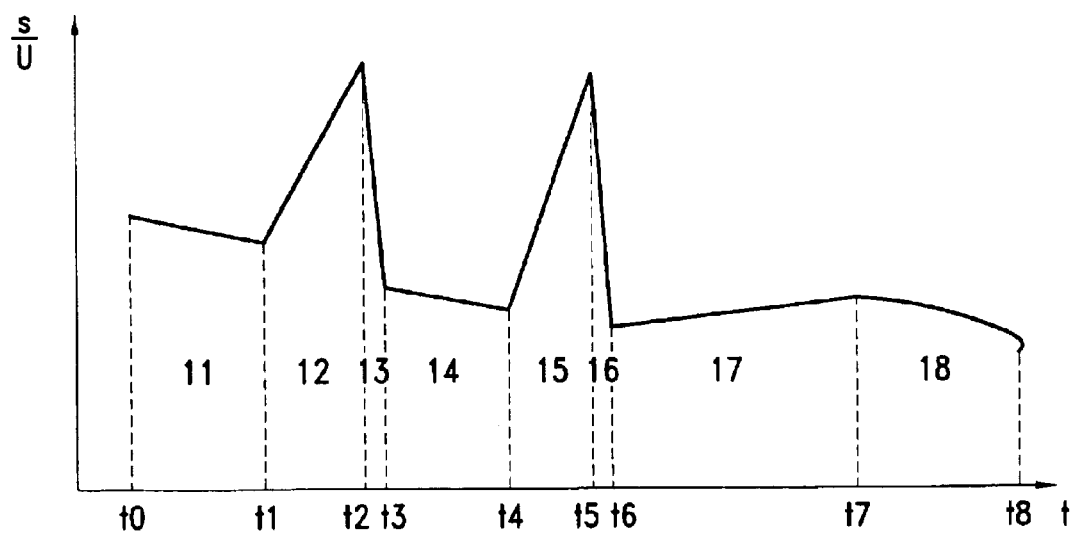
FIG. 5 shows a diagram, in which the respective time per revolution is plotted schematically over time.

The magnet 32 is integrated into the wheel body 21 in such a way that it closes a circuit within a reed contact (not shown in detail) of the non-rotating wheel electronics. The pulses generated in this manner are processed by the microcontroller 7b mounted in the component 30. Other suitable means, in particular, pulse generators for determining the revolutions of the wheel are also possible. In particular, the period of revolutions of the wheel is determined and stored in the buffer memory. From the thus generated function of time per revolution of the wheel (FIG. 4 shows the exemplary course of this function and FIG. 5, a schematic, smoothened course of this function), the standard distance per second or time interval valid for a pre-programmed standard diameter (or circumference) of the wheel is determined, for example once per second (whereby any other time interval is also possible) by a software integrated into the microcontroller 7b. The standard distance represents here a distance standardized to the standard diameter of the wheel.

The standard distance, which in accordance with the present invention represents a partial processing of the travel data (revolutions of the wheel) determined, is transmitted via radio by the transmitter 34 integrated into the puck-shaped component 30 to the display device 50, which in accordance with the invention is the means for further processing or displaying the at least partially processed travel data. As already described with reference to FIG. 1, the display device 50 is preferably fitted to the wrist of the user of the inline skate.

Figure 3:
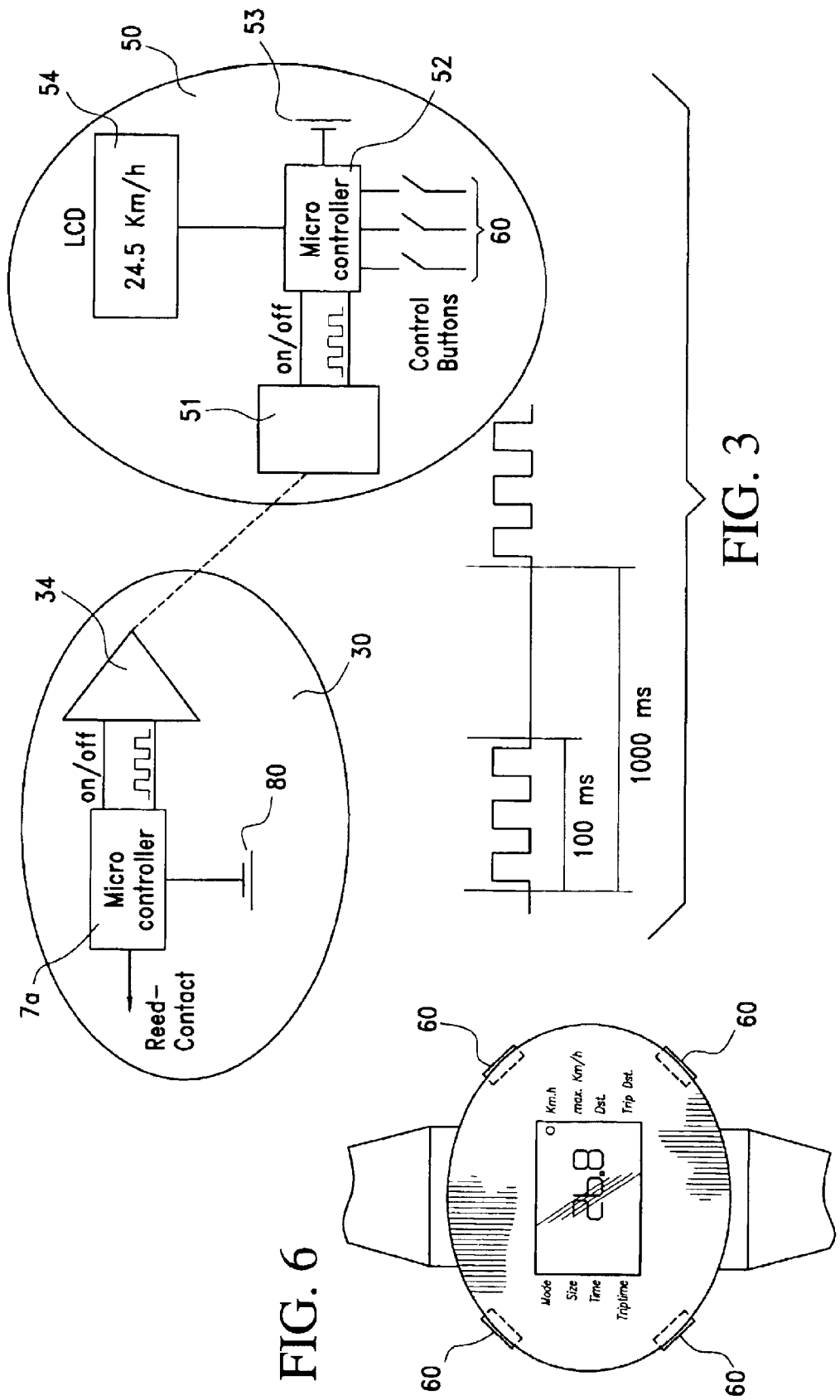
FIG. 3 shows a schematic block diagram for describing the transceiver system usable according to the invention.

The transceiver system of the present invention is shown once again schematically in FIG. 3. As already described, at the input end the microcontroller 7a receives pulses via the reed contact. Power is supplied to the microcontroller 7a and also the sender 34 preferably via a battery 80.

The signal representing the standard distance is transmitted to the sender 34, which transmits the signal via radio to a receiver 51 of the display device 50. While doing this the sender 34 is controlled via the microcontroller 7a in such a way that it transmits exclusively within defined transmitting time intervals (for example, 0.1–0.05 seconds per second). For the rest of the time the sender is switched off via the microcontroller 7a and switched on again only in time for the next transmitting process. A typical course of the signal is shown schematically in FIG. 3, below. One recognizes that here, in a total time interval of 1000 milliseconds, the signal containing the desired information is transmitted only over a period of 100 milliseconds. No signal transmission occurs during the remaining 900 milliseconds.

The receiver 51 can be analogously controlled or switched on and off via a microcontroller 52 provided in the display device 50. Power is supplied to the microcontroller 52 via a battery 53.

The signal received by the receiver 51 is transmitted to the microcontroller 52. As already described, the signal relates to a standard distance standardized to the standard diameter of the wheel. This standard distance is multiplied in the microcontroller 52 with the individual current diameter or circumference of the wheel. Hereby, now the distance actually covered per time interval is available, which is transmitted to a LCD display 54 for displaying.

As the current or actual diameter of the wheel decreases in the course of the service life of a roller of an inline skate, this decrease can be automatically compensated or updated by means of a wear function integrated in the microcontroller 52.

The information 'distance per time interval' can be used via the microcontroller 52 for the further computation of functions or travel quantities of the user. In particular, the current speed, the maximum speed, the average speed, distance covered per day, total distance covered, the skating duration, the current diameter and/or circumference of the wheel can be designated as functions or travel quantities of this type. These functions can be displayed on the LCD display. It is also possible to determine these functions or travel quantities already in the microcontroller 7a, whereby in this connection it always relates to "standard" functions, which, as already described, are to be changed with respect to the current diameter of the wheel.

The display device 50 is equipped with several switches 60, which, in particular, can be designed as push-buttons, whereby it is made possible for the skater or user to access the different functions of the device according to the invention. In particular, it is possible for the user to correct the diameter or the circumference of the wheels or rollers and also reset the day meters of maximum speed, daily distance covered and skating duration.

The wristwatch-like display device is once again shown in FIG. 6. One recognizes here the four switches 60, which allow a start, a programming or a menu navigation of the device.

Before starting a measurement, the display device 50 is activated by the user of the inline skate (pressing of the start switch 60). On receiving a corresponding start signal the microcontroller 52 switches on the receiver 51 for a defined start time interval, for example 30 seconds. When during this period the receiver 51 receives a signal from the transmitter 34 of the wheel electronics, this first signal is used for synchronizing the transmitting and receiving time intervals by a software integrated in the microcontroller 52. Thus, it can be achieved that the receiver 51 is switched on only then, when a transmission can be expected from the transmitter 34 of the wheel electronics. When the receiver 51 does not recognize a signal during the start interval, the display device 50 switches off again and must be manually switched on once again for carrying out a fresh measurement.

Owing to the fact that the transceiver system described is active only in short time intervals, the probability that a plurality of inline skate users (skaters) transmit or receive in the same time interval is very low. Thus, a jamming or interference of the signals of skaters among one another or a disturbance of one's own display through other skaters can be excluded to a large extent.

Preferably a signal frequency modulated to a carrier frequency is used as transfer signal. For example, it is possible to divide an interval of efficiently achievable units of time per wheel revolution into defined subintervals and to allocate a defined signal frequency to each sub-interval. When a carrier wave having a frequency of for example 433 MHz is used, a signal or information wave modulated to it can have a bandwidth of, for example 1 kHz, whereby adjacent sub-intervals differ in their information wave frequency by 1 Hz.

It is also possible to provide a digital signal transmission. For example, it would be possible to transmit the relevant information via 2-byte signals, whereby additionally a check byte could be transmitted. By means of a check byte of this type it is particularly possible to distinguish signals transmitted from several inline skate users who are directly next to one another.

What is claimed is:

1. A device for determining and displaying travel data of a user of a sports equipment which has contact with the ground, comprising:

a) a first microcontroller associated with said sports equipment for at least recording or partially processing travel data of said sports equipment based on an interaction between said sports equipment and the ground;
b) a transmitter for transmitting the travel data to a receiver having a display;
c) said receiver having a second microcontroller for at least further processing or displaying the partially processed travel data;
d) said transmitter only transmits within defined transmitting intervals such that between said intervals when said transmitter is not transmitting, said transmitter is switched off; and
e) said receiver is synchronized with said transmitter such that said receiver is switched on only when said transmitter is expected to transmit and switched off when transmission is not expected from said transmitter.

2. A device as in claim 1, wherein said first microcontroller is disposed on a wheel of the sports equipment.

3. A device as in claim 2, wherein said wheel includes a magnet in relative movement with a reed contact such that revolutions of said wheel are detected.

4. A device as in claim 3, wherein said magnet is imbedded within said wheel.

5. A device as in claim 2, wherein said first microcontroller is programmed to determine based on the revolutions of said wheel a function representing a time per revolution of said wheel.

6. A device as in claim 5, wherein said second microcontroller is programmed to process said function to obtain travel data taking into account an actual diameter of said wheel.

7. A device as in claim 2, wherein said first microcontroller is disposed in a housing separate from said wheel.

8. A device as in claim 7, wherein said wheel includes a recess and said housing is disposed within said recess.

9. A device for determining and displaying travel data of a user of a sports equipment which has contact with the ground, comprising:
a) means associated with said sports equipment for at least recording or partially processing travel data of said sports equipment based on an interaction between said sports equipment and the ground;
b) means for transmitting the travel data;
c) means for receiving said travel data;
d) said receiving means having means for at least further processing or displaying the partially processed travel data;
e) said transmitting means only transmits within defined transmitting intervals such that between said intervals when said transmitting means is not transmitting, said transmitting means is switched off; and
f) said receiving means is synchronized with said transmitting means such that said receiving means is switched on only when said transmitting means is expected to transmit and switched off when transmission is not expected from said transmitting means.

10. A method for determining and displaying travel data of a user of a sports equipment which has contact with the ground, comprising:
a) at least recording or partially processing the travel data based on an interaction between the sports equipment and the ground;
b) transmitting the travel data to a receiver having a display during defined transmitting intervals;
c) switching off the transmitter between the intervals;
d) at least further processing or displaying the partially processed data;
e) synchronizing the receiver with the transmitter such that the receiver is on only when a transmission is expected from the transmitter; and
f) switching off the receiver when transmission is not expected from the transmitter.

11. A method as in claim 10, wherein:
a) the sports equipment includes a wheel; and
b) said at least recording or partially processing the travel data generates a function representing a time per revolution of the wheel based on the revolutions of the wheel.

12. A method as in claim 11, and further comprising:
a) processing the function to obtain travel data taking into account an actual diameter of the wheel.

* * * * *

UNITED STATES PATENT AND TRADEMARK OFFICE
CERTIFICATE OF CORRECTION

| | |
|---|---|
| PATENT NO. | : 6,744,375 B1 |
| APPLICATION NO. | : 09/962807 |
| DATED | : June 1, 2004 |
| INVENTOR(S) | : Groos |

Page 1 of 1

It is certified that error appears in the above-identified patent and that said Letters Patent is hereby corrected as shown below:

Title page, left column, item (63), replace "PCT/EP00/02630" with --PCT/EP00/02635--

Signed and Sealed this
Thirteenth Day of August, 2013

Teresa Stanek Rea
*Acting Director of the United States Patent and Trademark Office*